June 30, 1964  F. RINKERMAN  3,139,063
BRAKE RELINING WARNING DEVICE
Filed April 25, 1963  2 Sheets-Sheet 1

INVENTOR.
FRANK RINKERMAN
BY James V. Franklin
ATTORNEYS

June 30, 1964  F. RINKERMAN  3,139,063
BRAKE RELINING WARNING DEVICE
Filed April 25, 1963  2 Sheets-Sheet 2

INVENTOR.
FRANK RINKERMAN
BY
James T. Franklin
ATTORNEYS

3,139,063
BRAKE RELINING WARNING DEVICE

Frank Rinkerman, Clifton, N.J., assignor to Raybestos-Manhattan, Inc., Passaic, N.J., a corporation of New Jersey
Filed Apr. 25, 1963, Ser. No. 275,712
3 Claims. (Cl. 116—67)

This invention relates to a brake relining warning device, and more particularly to a warning mechanism for use with a vehicle brake shoe and drum to give an audible signal indicating the need for relining the brake shoe.

The prime object of the present invention is the provision of a brake relining warning mechanism comprising a warning device that is mountable as a self-contained or integral unit on the brake shoe.

Ancillary objects of the invention are: (a) the provision of such a self-contained and shoe-mountable warning unit that of a consequence is a simple mechanical structure, which, therefore, also by incidence presents a rugged and reliable structure, and (b) the provision of such a warning device capable of giving a high-pitched recurring or repetitive audible sound, creating a persisting warning noise difficult to ignore.

To the accomplishment of the foregoing objects and such other objects as may hereinafter appear, the invention relates to the warning mechanism as defined in the appended claims taken together with the following specification and the accompanying drawings, in which:

Figure 1:
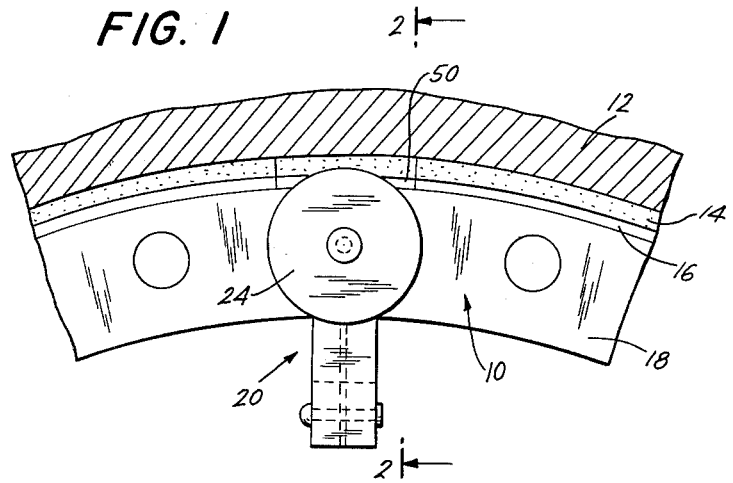
FIG. 1 is a fragmentary front elevation view partly in section of a vehicle brake showing the warning mechanism of my invention applied thereto.
Figure 2:
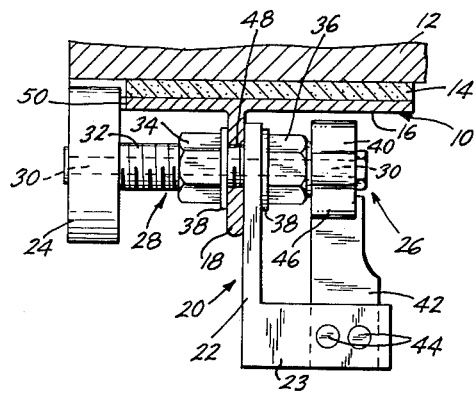
FIG. 2 is a view thereof taken in cross-section in the plane of the line 2—2 of FIG. 1.
Figure 3:
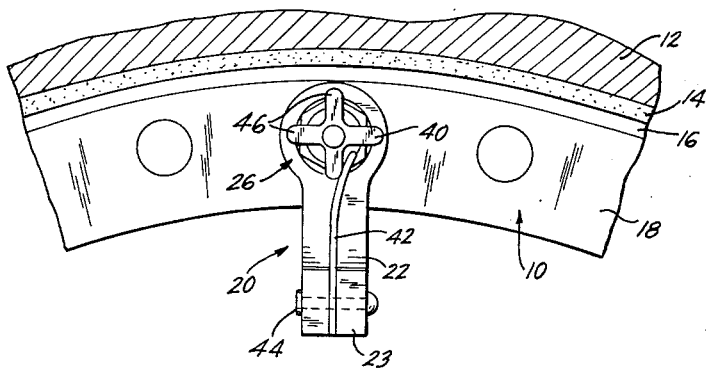
FIG. 3 is a fragmentary rear elevational view of said mechanism partly in section, the view being taken from the right side of FIG. 2.

Referring now more in detail to the drawings and having reference first to FIGS. 1 to 3 thereof, I show the structure of the invention applied to a vehicle brake comprising a brake shoe generally designated as 10 and a brake drum 12, a brake lining 14 being adheringly attached to the face or table portion 16 of the brake shoe, the brake shoe further including the usual web or flange supporting portion 18.

The warning mechanism of the present invention which is constructed to given an audible signal indicating the need for relining the brake shoe comprises a device generally designated as 20 which is mountable as a self-contained unit on the brake shoe 10. Said device comprises essentially a support 22 attachable to a part of the brake shoe and more particularly to the web or flange 18 thereof, a friction wheel 24 rotatable on said support and mounted thereon with reference to the depth of the brake lining for normal disengagement from the drum 12 of the vehicle brake, as clearly shown in FIGS. 1 and 2 of the drawings but for engagement by the drum when the brake lining is reduced to a thinness requiring relining, means generally designated as 26 also mounted on the support 22 for producing an audible signal when operated, and means generally designated as 28 on said support 22 directly connecting the said wheel 24 and said audible signal producing means whereby rotation of said wheel (when the same engages the drum 12) will produce the relining warning audible signal.

In the structure of FIGS. 1 to 3 of the drawings the friction wheel 24 is fixed to a shaft 30 mounted and rotatable in an outwardly threaded bearing 32 secured to the web or flange 18 by means of a nut 34 on one side of the flange 18 and a nut 36 on the other side of the flange 18, the support 22 being secured to the flange 18 by means of both of the nuts 34 and 36 with suitable washers 38, 38 being interposed in this mounting.

The audible signal producing means 26 comprises a rotatable clacker wheel 40 fixed to the shaft 30 and a spring finger 42 secured by means of the screws or rivets 44 to a transverse portion 23 of the support 22, the said spring finger being engageable repetitively or recurrently by the spaced web portions 46 of the clacker wheel 40.

For mounting this self-contained warning unit 20 onto the brake shoe, all that is required is to drill a hole 48 in the brake shoe flange 18 and grind a rectangular opening 50 along the side of the table 16 of the brake shoe and directly mount the self-contained unit in the described position.

In the operation of this form of the warning mechanism structure, when the lining 16 is worn down to approximately 1/16 of its depth or thickness, the friction wheel 24 comes into engagement with the drum 12 whereupon rotation of the friction wheel imparts a rotation to the clacker wheel 46, thereby producing a high pitched recurring audible sound, creating a persisting warning noise which the vehicle operator finds difficult to ignore and which warns him of the need of checking his brake lining for replacement, in the absence of which continued use of the brake lining would result in injury to the brake drum.

Figure 4:
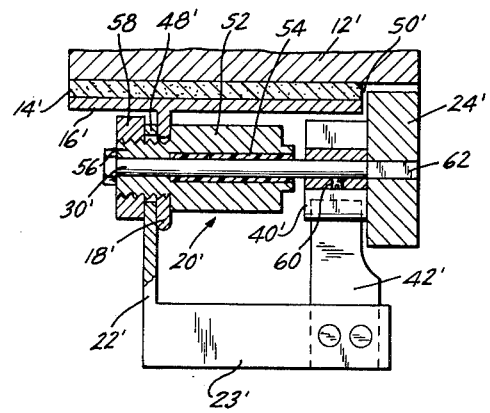
FIG. 4 is a view taken largely in cross-section showing a modification thereof.
Figure 5:
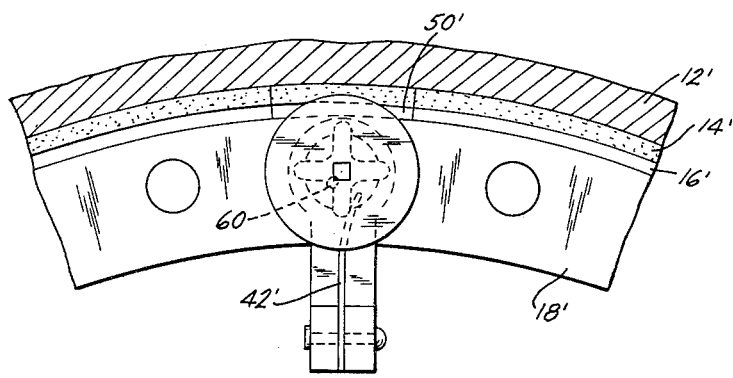
FIG. 5 is a front elevational view of the device shown in FIG. 4.

In the modification of the structure shown in FIGS. 4 and 5 of the drawings, the friction wheel and the clacker wheel are mounted in contiguous relation. In this form of the invention parts the same or similar to the corresponding parts of the structure shown in FIGS. 1 to 3 are designated by similar but primed reference characters. In this form of the invention the shaft 30 is mounted in an elongated bearing 52 provided internally with a Teflon (polytetrafluoroethylene) sleeve 54 acting as a lubricant member, the said bearing, threaded at one end 56, serving with the nut 58 for securely mounting the unit to the brake shoe flange 18'. The clacker wheel 40' is secured to the shaft by means of an adjusting screw 60. The friction wheel 24' is attached to the shaft by any desirable means to permit replacement and substitution of friction wheels of differing diameters, a simple means for this purpose being the squaring of the shaft end 62 and the forcible insertion of the friction wheel thereto. The requirements differ in different localities as to the amount of permissible reduction in the thickness of the lining before relining is required; and to make corresponding changes in the mounting of the unit it becomes necessary only to attach to the shaft 30' a wheel of the required diameter. The operation and use of the self-contained unit of this modification are substantially the same as that described for the unit of FIGS. 1 to 3 of the drawings.

The use and operation of the advantages of the warning mechanism of the present invention will be fully apparent from the above detailed description of structure, operation and use. It will be further apparent that many changes may be made in the construction thereof without departing from the spirit of the invention defined in the following claims.

I claim:

1. A warning mechanism for use with a vehicle brake shoe and drum to give an audible signal for the need of relining the brake shoe, comprising a device mountable as a self-contained unit on a part of the brake shoe, said device comprising a support attachable to a part of the brake shoe, a wheel rotatable on said support and mounted thereon with reference to the depth of the brake lining for normal disengagement from the drum of the vehicle brake but for engagement by the drum when the brake lining is reduced to a thinness requiring relining, means also mounted on said support for producing an audible signal when operated, and means on said support directly connecting the said wheel and said audible signal producing means whereby rotation of said wheel will produce the relining warning audible signal.

2. A warning mechanism for use with a vehicle brake shoe and drum to give an audible signal for the need of relining the brake shoe, comprising a device mountable as a self-contained unit on a part of the brake shoe, said device comprising a support attachable to a part of the brake shoe, a shaft rotatable on said support, a wheel fixed to said shaft and mounted on said support with reference to the depth of the brake lining for normal disengagement from the drum of the vehicle brake but for engagement by the drum when the brake lining is reduced to a thinness requiring relining, means also mounted on said support for producing an audible signal when operated, said means including a clacker wheel for producing a repetitive noise also fixed to said shaft, whereby rotation of said wheel rotates the clacker wheel to produce the relining warning audible signal.

3. A warning mechanism for use with a vehicle brake shoe and drum to give an audible signal for the need of relining the brake shoe, comprising a device mountable as a self-contained unit on a part of the brake shoe, said device comprising a support attachable to a part of the brake shoe, a shaft rotatable on said support, a friction wheel fixed to said shaft on said support with reference to the depth of the brake lining for normal disengagement from the drum of the vehicle brake but for engagement by the drum when the brake lining is reduced to a thinness requiring relining, means also mounted on said support for producing an audible signal when operated, said means comprising a rotatable clacker wheel and a finger engageable thereby for producing a repetitive noise, and means connecting the said friction wheel and said clacker wheel whereby rotation of said friction wheel will produce the relining warning audible signal.

References Cited in the file of this patent
UNITED STATES PATENTS

| | | |
|---|---|---|
| 359,402 | Paff | Mar. 15, 1887 |
| 569,158 | Arnold | Oct. 13, 1896 |
| 1,232,549 | Hoover | July 10, 1917 |
| 2,609,640 | Newell et al. | Sept. 9, 1952 |
| 2,636,090 | Branschofsky | Apr. 21, 1953 |
| 2,660,973 | Portlance | Dec. 1, 1953 |